Sept. 29, 1931.   A. W. SANSBURN   1,825,093
SHOCK ABSORBING SPRING FOR MOTOR TRUCKS
Filed April 8, 1929   2 Sheets-Sheet 1

Inventor
A. W. Sansburn
By Lacey & Lacey, Attorneys

Sept. 29, 1931. A. W. SANSBURN 1,825,093
SHOCK ABSORBING SPRING FOR MOTOR TRUCKS
Filed April 8, 1929 2 Sheets-Sheet 2
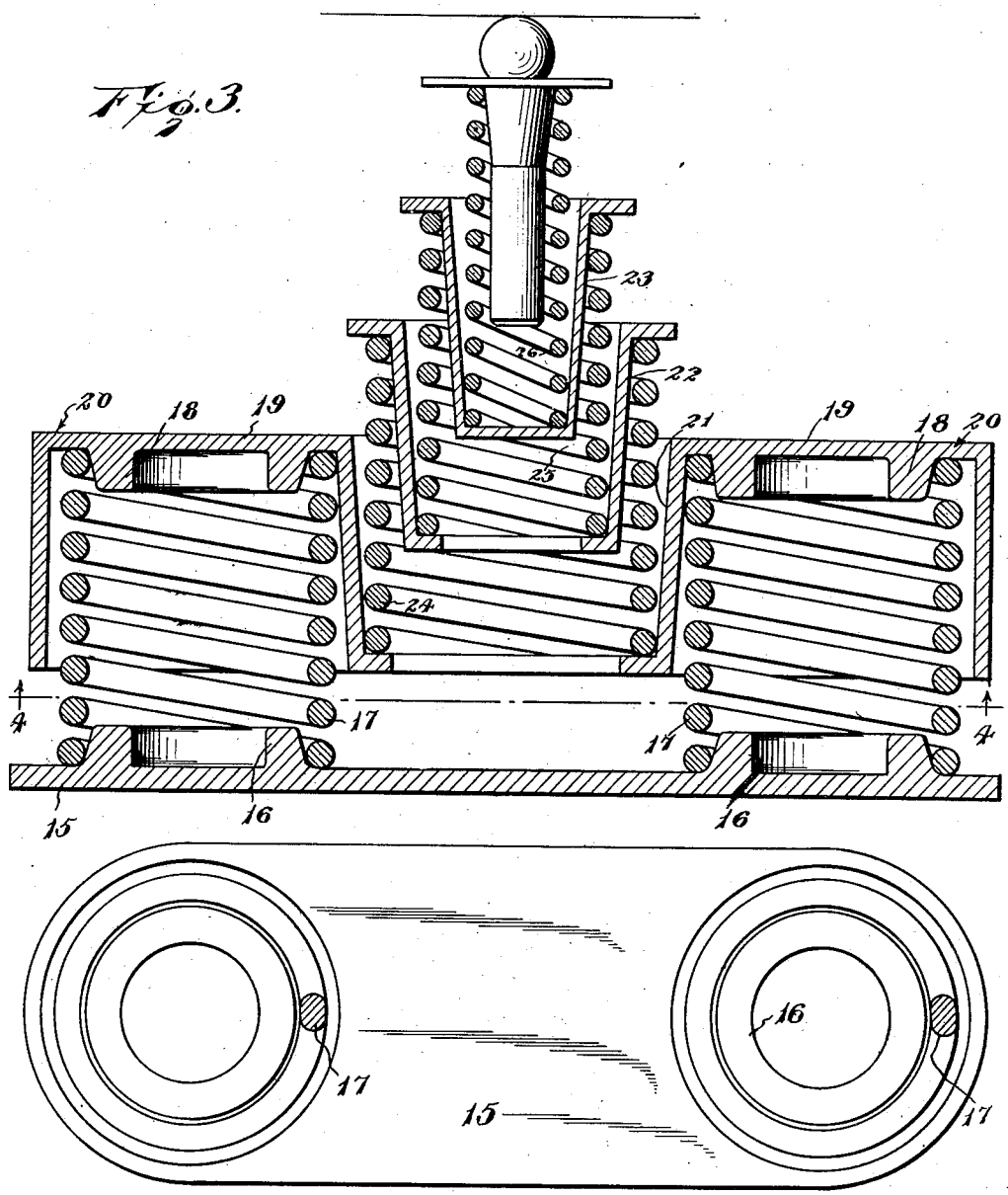

Patented Sept. 29, 1931

1,825,093

UNITED STATES PATENT OFFICE

ALEXANDER W. SANSBURN, OF PILARES DE NACOZARI, SONORA, MEXICO

SHOCK ABSORBING SPRING FOR MOTOR TRUCKS

Application filed April 8, 1929. Serial No. 353,518.

The present invention is directed to improvements in shock absorbing springs for motor trucks.

The primary object of the invention is to provide a device of this kind so constructed that it can be conveniently placed between the body frame of the vehicle and the rear axle in order that shocks incident to travelling over road obstructions will be effectively absorbed.

Another object of the invention is to provide a device of this character which is constructed in such manner that the load will be yieldably sustained whether comparatively light or extremely heavy.

Another object of the invention is to provide a device of this character which is extremely simple in construction, durable, efficient in operation, and one which can be manufactured at a very small cost.

With these and other objects in view, this invention resides in the novel features of construction, formation, combination and arrangement of parts to be hereinafter more fully described, claimed and illustrated in the accompanying drawings, in which:

Figure 3 is a vertical sectional view through a modified form of the invention.

Figure 4 is a sectional view on the line 4—4 of Figure 3.

Figure 1:
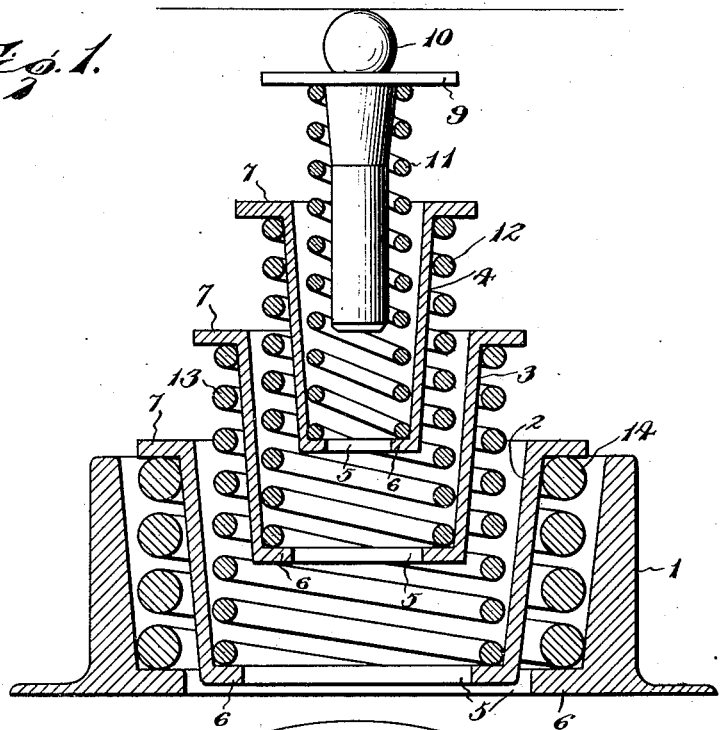
Figure 1 is a vertical sectional view through the device.
Figure 2:
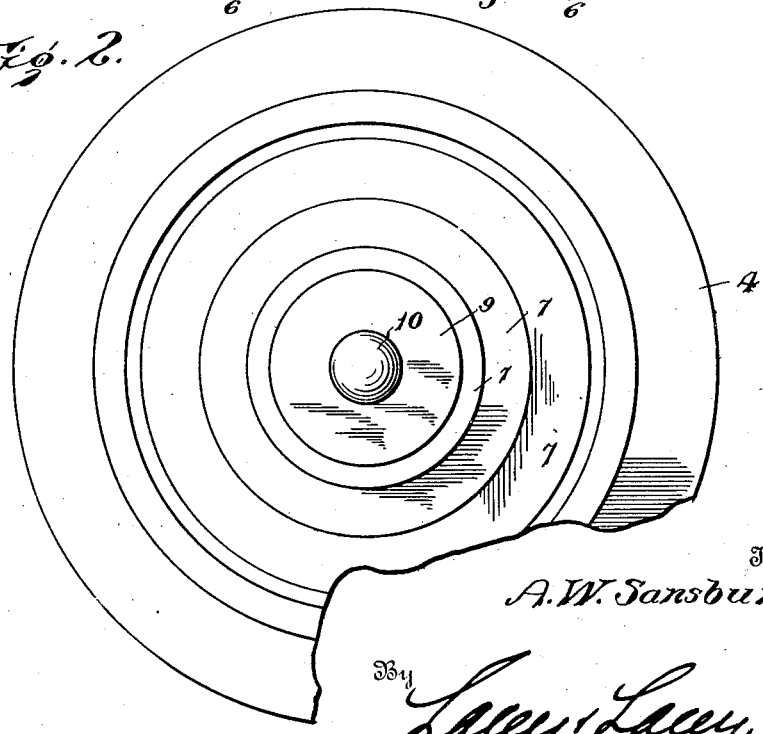
Figure 2 is a top plan view thereof.

The device consists of a plurality of concentrically arranged cups 1, 2, 3 and 4, which are preferably tapered in order that there will be no binding action upon the coil springs used in connection therewith during expansion and compression of the same.

Each cup is provided with an opening 5 in its bottom to form annular horizontally disposed flanges 6, said cups having their respective upper ends provided with horizontal flanges 7, the purpose of which will be later explained.

Associated with the cup 4 is a plunger 8 which has a flange 9 upon its upper end and upon which is mounted a head 10 to receive the initial load or shock from the vehicle body. This head may be formed from any suitable material.

Mounted in the cup 4 is a coil spring 11 which confines the plunger and has its lower helix engaged upon the flange of said cup and its upper helix engaged with the flange 9 of the plunger.

Encircling the cup 4 and having its lower helix resting upon the flange 6 of the cup 3 is a coil spring 12, the upper helix of which bears against the flange 7 of the cup 4. The cup 3 is likewise encircled by a coil spring 13 which is arranged with its upper helix engaged with the flange 7 thereof and its lower helix resting upon the flange 6 of the cup 2. Interposed between the cups 1 and 2 is a coil spring 14 which has its lower helix resting upon the flange 6 of the cup 1 and its upper helix bearing against the flange 7 of the cup 2.

It will be observed that the springs 11, 12, 13 and 14 increase in strength, the spring 14 being the strongest. The spring 14 is of such strength that even when the device is subjected to the heaviest load, said spring will not be entirely compressed and, in this manner, will maintain the load yieldably supported under all conditions.

The cup 1 may be secured to an axle of the vehicle in any suitable manner and the head 10 is so arranged that the load of the body will be initially received thereon. Obviously, the load will be first imparted to the spring 11 and then successively to the springs 12, 13 and 14 respectively. When the device is subjected to the fullest extent of the load the respective flanges 7 of the cups 2, 3 and 4 will contact and at which time the associated springs are fully compressed. At this time the flange 9 will engage the flange 7 of the cup 4. When the springs 11, 12 and 13 are fully compressed the spring 14 will be partly compressed in order to yieldably support the entire load to absorb shocks which may occur. Obviously, the cups 3 and 4 will fully nest within the cup 2 when subjected to capacity loads, thus compressing the associated springs, and owing to the tapered formation of the cups, binding of the springs with the sides thereof is prevented.

In Figures 3 and 4 of the drawings, I have illustrated a slightly modified form of the invention designed for us in comparatively narrow spaces. In lieu of the cup 1, I employ an elongated base plate 15 adapted to be secured to the axle and has carried thereby bosses 16—16 for centering the lower helixes of the coil springs 17—17, the upper helixes thereof being engaged with the bosses 18—18 and seated within sockets 20—20 of a cap plate 19. Arranged between these sockets is a cup 21 which cooperates with the cups 22 and 23, and springs 24, 25 and 26 in the same manner as the cups of the preferred form of the invention and since the operation is the same as that of the preferred form, a detailed description thereof is not thought necessary.

From the foregoing, it is thought that the construction, operation, and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What is claimed is:

1. In shock absorbing springs for vehicles, relatively movable base and cap plates, the cap plate having spaced sockets and a cup between the sockets, helical springs in said sockets bearing upon said base plate, a helical spring in said cup, a plurality of concentrically disposed cups having flanges upon their upper and lower ends, and a plurality of coil springs encircling the cups and having their terminals bearing upon the flanges of the respective cups, the lowermost of said plurality of cups being seated upon the spring carried by said cap plate cup.

2. Shock absorbing springs for vehicles comprising a base plate having bosses thereon, a cap plate having spaced sockets above the bosses, and having a centrally disposed cup between the sockets, helical springs carried in said sockets and bearing upon said base plate, said springs being centered on said bosses, a helical spring disposed in said centrally disposed cup, a plurality of concentrically disposed cups having flanges upon their upper and lower ends, and a plurality of coil springs encircling the cups and having their terminals bearing upon the flanges of respective cups, the lowermost cup of said plurality of cups being seated upon the spring carried by said cap plate cup.

In testimony whereof I affix my signature.

ALEXANDER W. SANSBURN.